(12) United States Patent
Marchlewski et al.

(10) Patent No.: US 10,414,321 B2
(45) Date of Patent: Sep. 17, 2019

(54) PICK-UP TRUCK WINCH APPARATUS

(71) Applicant: FORD GLOBAL TECHNOLOGIES, LLC, Dearborn, MI (US)

(72) Inventors: Jack Marchlewski, Saline, MI (US); Vincent Anthony Chimento, Plymouth, MI (US); Dragan B. Stojkovic, Taylor, MI (US); Joshua Robert Hemphill, White Lake, MI (US); Robert Reiners, Grosse Ile, MI (US); Jeffrey Gray, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/706,008

(22) Filed: Sep. 15, 2017

(65) Prior Publication Data

US 2019/0084466 A1 Mar. 21, 2019

(51) Int. Cl.
| | | |
|---|---|---|
| *B60P 1/64* | (2006.01) | |
| *B60P 3/10* | (2006.01) | |
| *B66D 1/46* | (2006.01) | |
| *B66D 1/00* | (2006.01) | |
| *B60P 3/06* | (2006.01) | |

(52) U.S. Cl.
CPC ........... *B60P 1/6409* (2013.01); *B60P 3/1066* (2013.01); *B66D 1/00* (2013.01); *B66D 1/46* (2013.01); *B60P 3/06* (2013.01)

(58) Field of Classification Search
CPC ...... B60P 1/6409; B60P 1/6454; B60P 3/1066
USPC ......... 224/517; 254/323, 325, 327; 414/494, 414/500, 538, 559
See application file for complete search history.

(56) References Cited

U.S. PATENT DOCUMENTS

| | | | | |
|---|---|---|---|---|
| 1,546,737 A | * | 7/1925 | Latimer | B66C 23/40 254/328 |
| 2,603,370 A | * | 7/1952 | Hanzel | B60P 3/07 254/127 |
| 2,963,186 A | * | 12/1960 | Beck | B60P 1/6454 298/1 R |
| 3,370,726 A | * | 2/1968 | Mitsuyoshi | B60P 1/43 414/494 |
| 3,554,397 A | * | 1/1971 | Cluff | B62D 43/045 414/463 |
| 3,977,546 A | * | 8/1976 | Loza | B60P 3/125 414/563 |
| 4,368,002 A | * | 1/1983 | Kryzyosiak, Jr. | B60P 3/08 254/415 |
| 4,406,476 A | * | 9/1983 | Brandschain | B60P 3/125 280/402 |

(Continued)

FOREIGN PATENT DOCUMENTS

GB 2317598 10/2000

*Primary Examiner* — James Keenan
(74) *Attorney, Agent, or Firm* — Vichit Chea; Brooks Kushman P.C.

(57) ABSTRACT

A winch is disclosed for a pick-up bed having a floor, and a front wall. The winch includes a winch motor and spool assembled to the truck body below the floor. An upper pulley is assembled to the front wall with a cable wound around the spool that is extendable and retractable from the spool. The cable is routed over the upper pulley through an opening defined by the front wall. The opening is spaced from the floor to facilitate loading articles into and unloading articles from the truck bed.

11 Claims, 5 Drawing Sheets

(56) References Cited

U.S. PATENT DOCUMENTS

| | | | | |
|---|---|---|---|---|
| 4,704,062 A | * | 11/1987 | Hale | B62D 53/062 |
| | | | | 280/441.2 |
| 4,807,899 A | * | 2/1989 | Belcher | B60D 1/38 |
| | | | | 280/477 |
| 5,509,639 A | | 4/1996 | Ellis | |
| 7,186,069 B2 | * | 3/2007 | Ehler | B60P 1/435 |
| | | | | 414/462 |
| 8,534,978 B2 | | 9/2013 | Dieziger | |

\* cited by examiner

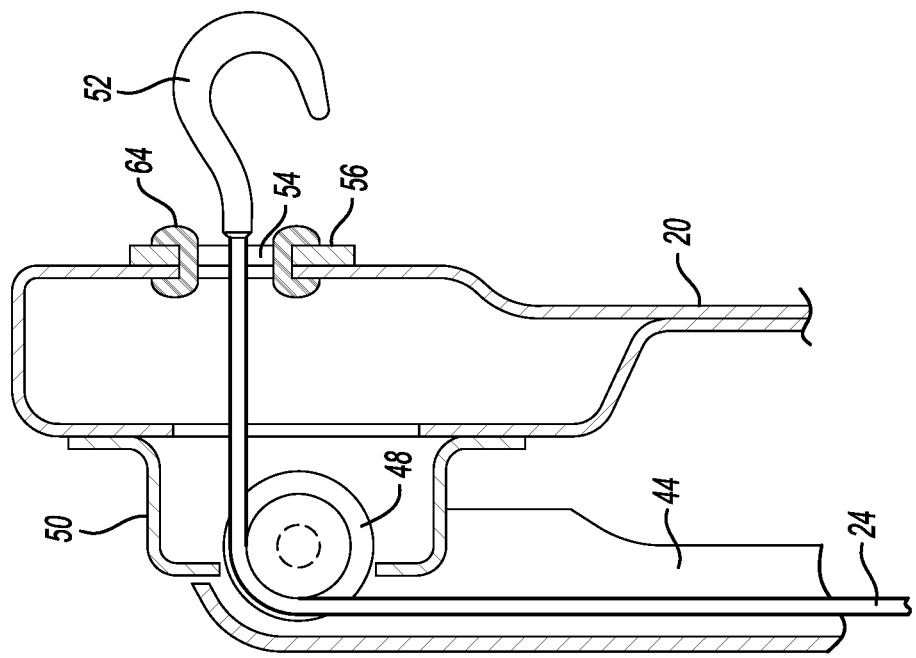
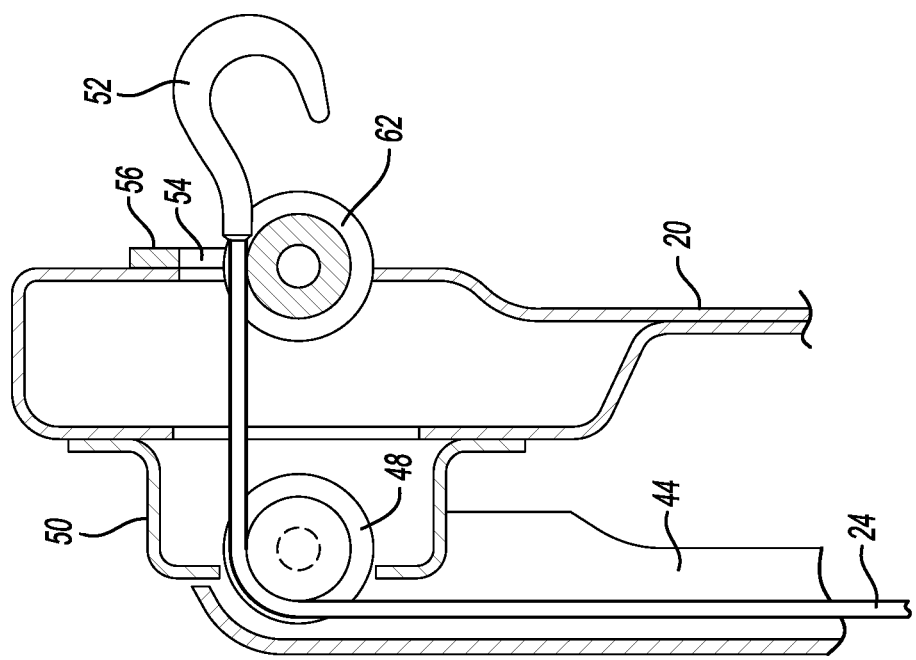

PICK-UP TRUCK WINCH APPARATUS

TECHNICAL FIELD

This disclosure relates to a pick-up truck having a winch assembled below the bed floor with a cable entrained over a pulley attached to a front wall in the center of the bed area.

BACKGROUND

Pick-up trucks are popular, in part, because they may be used to transport a wide variety of objects. For example, pick-up trucks may be used to transport relatively heavy wheeled vehicles such as motorcycles, All Terrain Vehicles (ATVs), snow mobiles, personal watercraft, and lawn tractors. Ramps may be used to facilitate loading and unloading wheeled vehicles into the bed of the pick-up truck, but even with the use of ramps heavy objects may be difficult to load into the truck bed that may be more than three feet above the ground.

Winches may be used to facilitate loading vehicles into the truck bed. Bed winch mount assemblies are known for attaching a winch and winch motor or drive to pick-up truck beds. However, the assemblies are designed to be attached to the top of the floor of the truck bed, stake pockets on the top edge of the sidewalls, the end wall of the bed, or the cab of the pick-up truck. These types of winch mounting assemblies take up cargo space within the truck bed. Permanent connectors or adapters are required to be attached to the pick-up truck to receive the bed winch mount assemblies that necessitate drilling holes in the truck bed and may compromise the anti-corrosion coatings and paint.

Aluminum pick-up trucks have been developed to reduce vehicle weight and provide improved fuel efficiency, increased cargo capacity and better handling. Fasteners such as common steel screws and bolts are difficult to adequately secure to the body panels forming the pick-up truck bed and are not recommended to be used with an aluminum pick-up truck box. In addition, galvanic corrosion may develop between the aluminum body parts and steel fasteners that can adversely affect the paint or durability of the pick-up truck bed.

This disclosure is directed to solving the above problems and other problems as summarized below.

SUMMARY

According to one aspect of this disclosure, a pick-up truck is disclosed that includes a a truck body including a truck bed having a floor and a front wall. A winch drive is assembled to the truck body below the floor. An upper pulley is assembled to the front wall and a cable is extendable and retractable from the winch drive. The cable is routed over the upper pulley through an opening defined by the front wall to load articles into and unload articles from the truck bed.

According to another aspect of this disclosure a winch is disclosed for a pick-up truck bed having a floor, and a front wall. The winch includes a winch motor and spool assembled to the truck body below the floor. An upper pulley is assembled to the front wall with a cable wound around the spool that is extendable and retractable from the spool. The cable is routed over the upper pulley through an opening defined by the front wall. The opening is spaced from the floor to facilitate loading articles into and unloading articles from the truck bed.

According to other aspects of this disclosure as it relates to either the pick-up truck or winch, a guide channel may be attached to a cab-facing surface of the front wall that extends upwardly from the lower pulley through the guide channel to the upper pulley.

The winch drive may be attached to a bracket that may be attached to a bottom surface of the floor of the truck bed and a lower pulley may be attached to a clevis provided on the bracket.

The winch drive may include an electric motor and a spool adapted to be rotated by the motor to extend and retract the cable from the spool.

A lower pulley may be attached to a bottom surface of the floor and a guide channel may be provided that extends upwardly between the lower pulley and the upper pulley. The cable may extend from the lower pulley through the guide channel to the upper pulley.

A remote-control system may be operatively connected to the winch drive assembly that may be utilized to control the winch drive assembly.

The above aspects of this disclosure and other aspects will be described below with reference to the attached drawings.

BRIEF DESCRIPTION OF THE DRAWINGS

FIG. 6 is a cross-section view similar to FIG. 3 of an alternative design with a pulley added to the front wall below the opening defined by the front wall.

FIG. 7 is a cross-section view similar to FIG. 3 of an alternative design with a bushing provided on the front wall around the opening defined by the front wall and the escutcheon.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
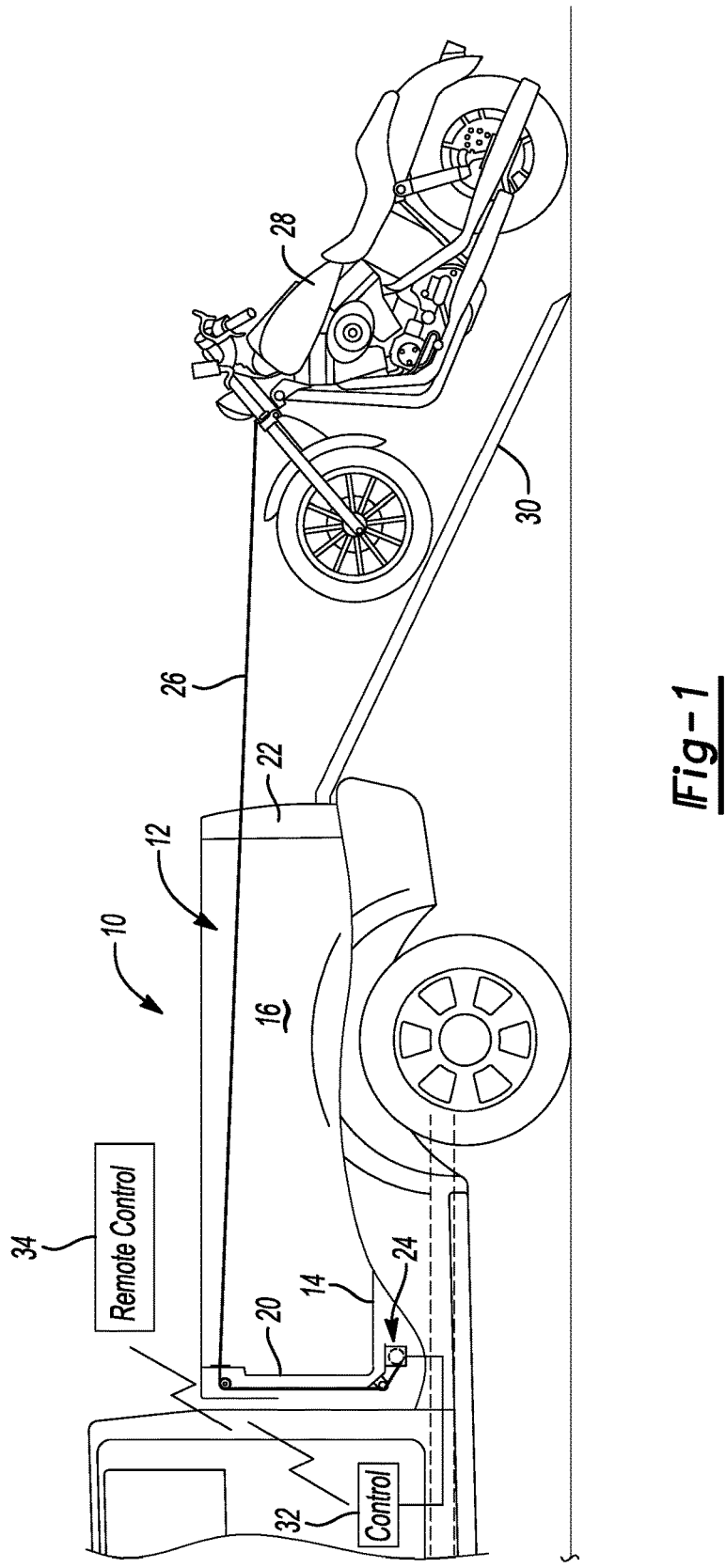
FIG. 1 is a fragmentary side elevation view of a pick-up truck including the winch system of this disclosure pulling a motorcycle up a ramp and into the truck bed.

Referring to FIG. 1, a pick-up truck is generally indicated by reference numeral 10. The pick-up truck 10 features a truck bed 12 that is formed by a floor 14, a pair of sidewalls 16, a front wall 20 and a tailgate 22. A winch 24 is shown disposed below the floor 14. The winch 24 is utilized to extend and retract a cable 26. The cable 26 is attached to an article 28, such as the illustrated motorcycle, to assist in loading and unloading the article that is rolled up and down a ramp 30. The winch 24 may be controlled by a remote control system that includes a remote control receiver 32 and a key fob transmitter 34.

Figure 2:
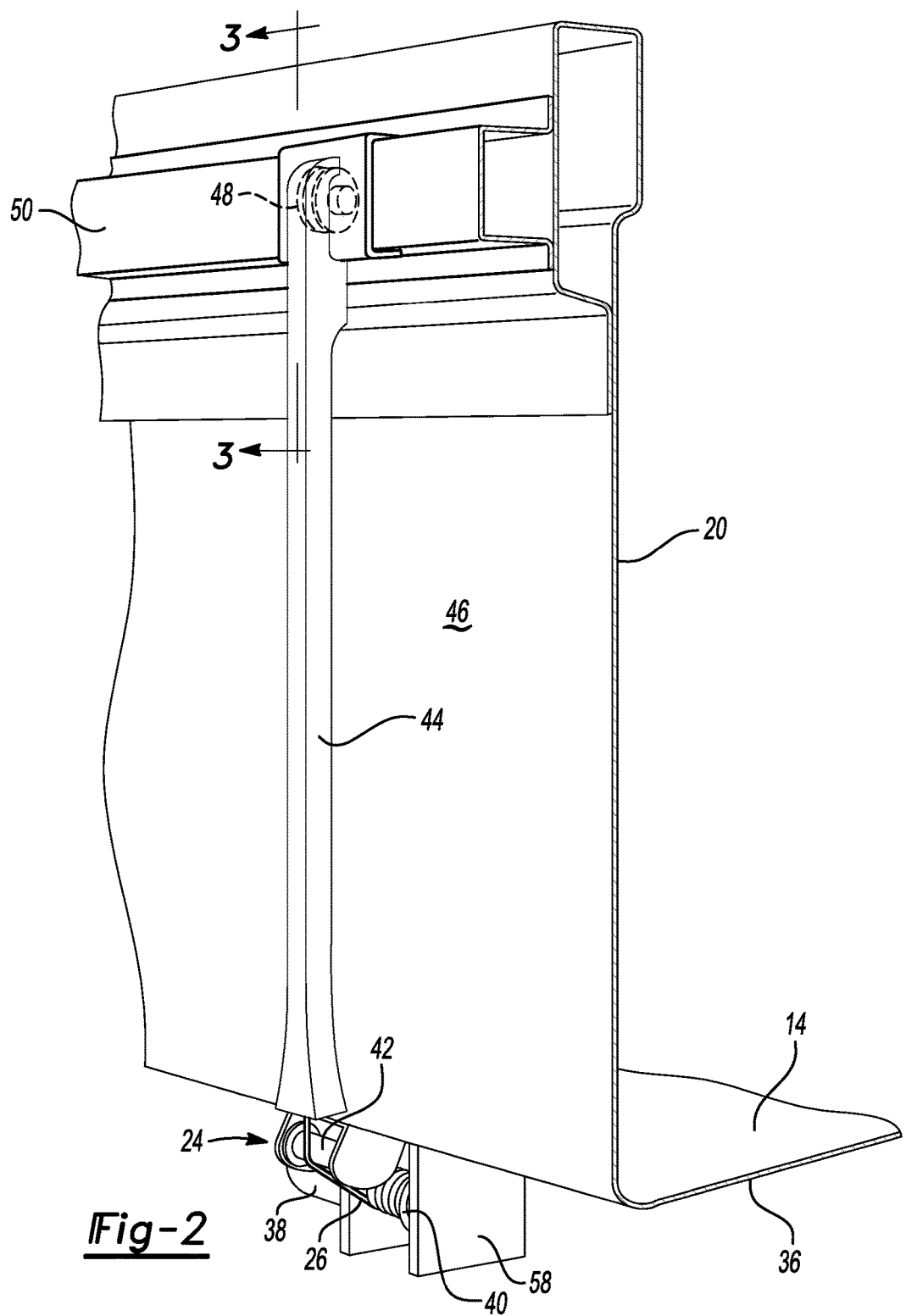
FIG. 2 is a fragmentary view partially in cross-section of the winch system and front wall of the pick-up truck.

Referring to FIG. 2, the winch 24 is shown attached to a bottom surface 36 of the floor 14 by a bracket 58. The winch 24 may also be referred to herein as a winch drive. The winch 24 includes an electric motor 38 and a spool 40. The cable 26 is wound around the spool 40 and is adapted to be extended and retracted from the spool 40. The cable 26 is routed from the spool 40 over a lower pulley 42 and through a guide channel 44. The guide channel 44 is attached to a cab-facing surface 46 of the front wall 14. An upper pulley 48 is attached to the front wall 14 at a location spaced above the floor 14. The guide channel 44 extends upwardly along the cab-facing surface 46 between the lower pulley 42 and the upper pulley 48. A reinforcing beam 50 may be attached to the cab-facing surface 46 of the front wall 14 to strengthen the front wall 14 where the upper pulley 48 is assembled.

Figures 3, 4:
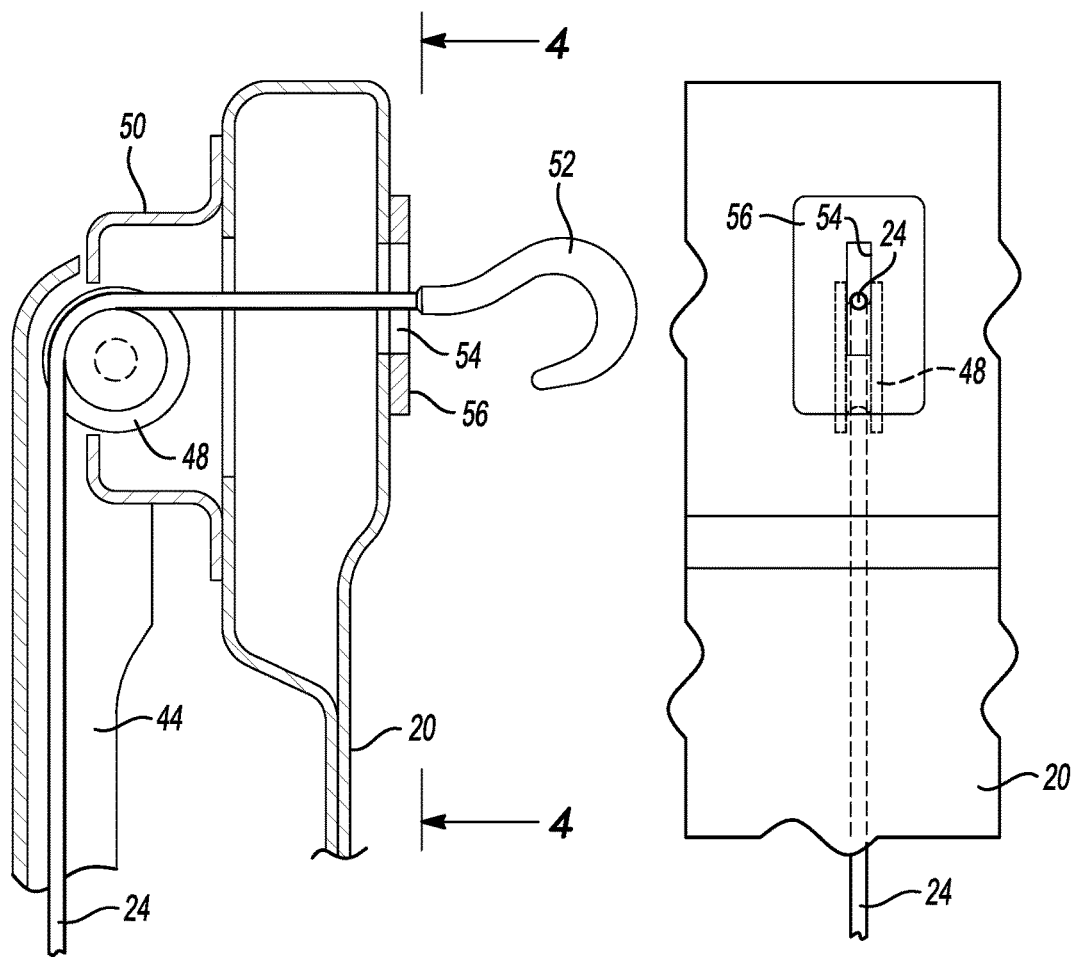
FIG. 3 is a cross-section view taken along the line 3-3 in FIG. 2.
FIG. 4 is a cross-section view taken along the line 4-4 in FIG. 3.

Referring to FIG. 3, the upper portion of the guide channel 44 is shown enclosing the cable 26 and the upper pulley 48. The reinforcing beam 50 reinforces the front wall and also may be used to support the upper pulley 48. A hook 52 is attached to the end on the cable 26 but it should be understood that other types of detachable attachment devices may be attached to the end of the cable 26. The cable 26 is routed through an opening 54 in the front wall 20 and an escutcheon 56. The escutcheon 56 reinforces the opening 54 and prevents distortion of the opening 54.

Referring to FIG. 4, the front wall 20 is partially illustrated to show the cable 26 wrapped over the upper pulley 48. The cable extends through the opening 54 and escutcheon 56.

Figure 5:
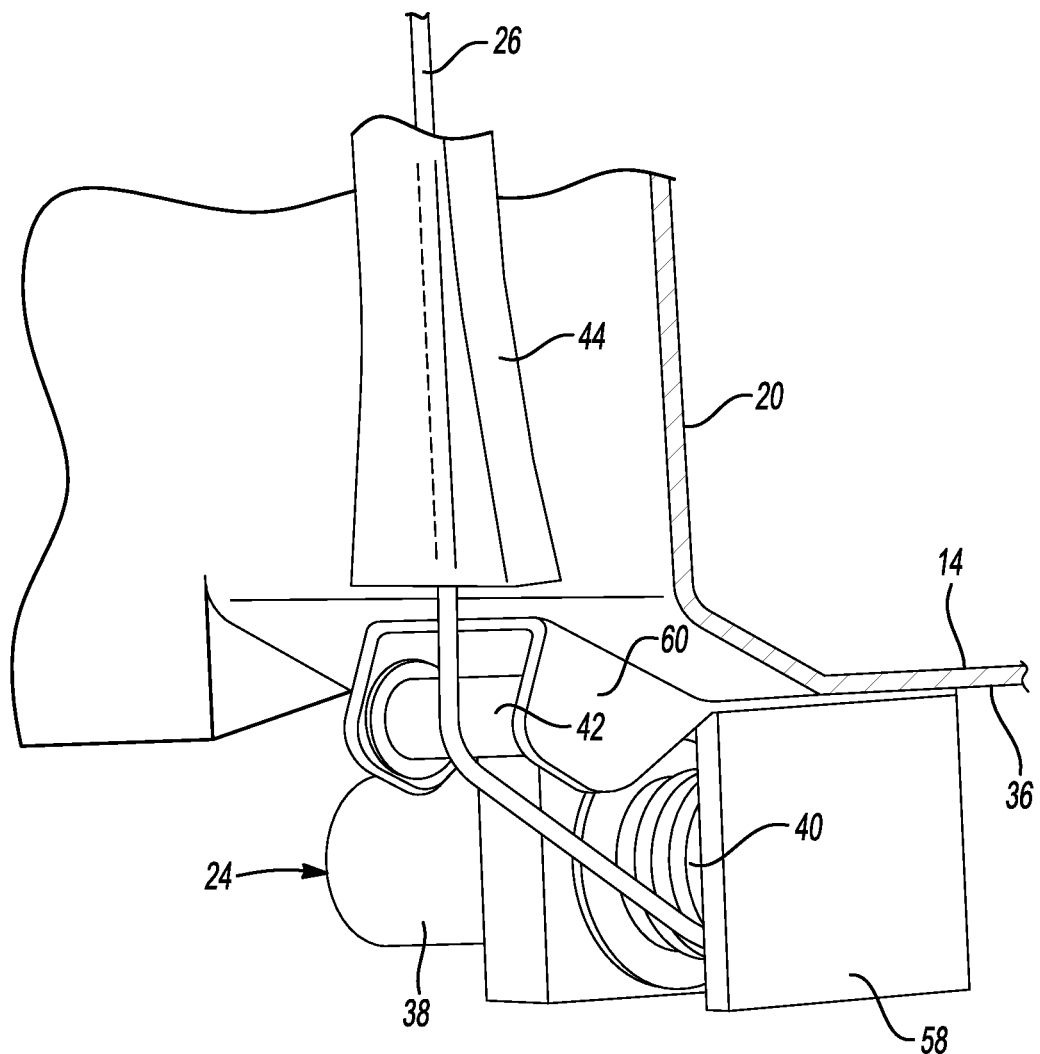
FIG. 5 is a fragmentary perspective view of the winch system and a portion of the front wall and floor of the pick-up truck bed.

Referring to FIG. 5, The winch 24 is shown attached to the bottom surface 36 of the floor 14 proximate the front wall 20. The winch 24 includes the electric motor 38 and spool 40 that are attached to a bracket 58. The bracket 58 may be attached to the floor 14 by fasteners or welds. A clevis 60 retains the lower pulley 42 that guides the cable 26 into the guide channel 44.

Referring to FIG. 6, the same portion of the front wall 20 shown in FIG. 3 is illustrated with an exit pulley 62 attached to the front wall at the bottom of the opening 54. The cable 24 is shown extending through the guide channel 44 to the upper pulley 48 that is supported by the reinforcing beam 50. The exit pulley 62 eliminates wear caused by extending and retracting the cable on the opening 54 and escutcheon 56. The exit pulley 62 also prevents the hook 52 from being drawn into the opening 54.

Referring to FIG. 7, the same portion of the front wall 20 shown in FIG. 3 is illustrated with a bushing 64 attached to the front wall around the opening 54. The cable 24 is again shown extending through the guide channel 44 and around the upper pulley 48 supported by the reinforcing beam 50. The bushing 64 prevents wear on the opening 54 and escutcheon 56 that may otherwise occur as the cable 24 is extended and retracted. The bushing 64 also prevents the hook 52 from being drawn into the opening 54.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pick-up truck comprising:
   a truck body including a truck bed having a floor, and a front wall;
   a winch drive assembled to the truck body below the floor;
   an upper pulley assembled to the front wall at a location on an upper half portion thereof;
   a cable disposed in front of a cab-facing surface of the front wall to be extendable and retractable from the winch drive, the cable being routed over the upper pulley through an opening defined by the front wall at a location spaced above the floor to load articles into and unload articles from the truck bed; and
   a lower pulley attached to a bottom surface of the floor; and
   a guide channel extending upwardly between the lower pulley and the upper pulley, the guide channel being attached to the cab-facing surface of the front wall wherein the cable extends from the lower pulley through the guide channel to the upper pulley.

2. The pick-up truck of claim 1 further comprising:
   a bracket attached to a bottom surface of the floor of the truck bed, wherein the winch drive is attached to the bracket; and wherein
   the lower pulley is attached to a clevis provided on the bracket.

3. The pick-up truck of claim 1 wherein the winch drive includes an electric motor and a spool adapted to be rotated by the motor to extend and retract the cable from the spool.

4. The pick-up truck of claim 1 further comprising:
   an exit pulley attached to the front wall adjacent the opening, wherein the cable is routed over the exit pulley.

5. The pick-up truck of claim 1 further comprising:
   a remote-control system operatively connected to the winch drive for controlling the winch drive.

6. A winch for a truck bed having a floor, and a front wall, the winch comprising:
   a motor and spool assembled to the truck bed below the floor;
   an upper pulley assembled to of the front wall at a location on an upper half portion thereof; and
   a cable attached to the spool that is routed in front of a cab-facing surface of the front wall upwardly through a guide channel attached to the cab-facing surface of the front wall, over the upper pulley, and through an opening defined in an upper portion of the front wall spaced above the floor to facilitate loading articles into and unloading articles from the truck bed.

7. The winch of claim 6 further comprising:
   a mounting plate attached to the floor of the truck bed, wherein the motor and spool are attached to the mounting plate.

8. The winch of claim 6 wherein the motor is adapted to rotate the spool to wind and unwind the cable on the spool.

9. The winch of claim 6 further comprising:
   a lower pulley attached to the floor; wherein
   the guide channel extends upwardly between the lower pulley and the upper pulley, and wherein the cable extends from the lower pulley through the guide channel to the upper pulley.

10. The winch of claim 9 further comprising:
    an exit pulley attached to the front wall adjacent the opening, wherein the cable is routed over the exit pulley.

11. The winch of claim 6 further comprising:
    a remote-control system operatively connected to the winch for controlling the winch.

* * * * *